United States Patent [19] [11] Patent Number: 4,909,887
Wagenknecht et al. [45] Date of Patent: Mar. 20, 1990

[54] DENTAL ADHESIVE COMPOUND

[75] Inventors: Günther Wagenknecht; Jürgen Müller, both of Echzell, Fed. Rep. of Germany

[73] Assignee: GDF Gesellschaft für Dentale Forschung und Innovationen GmbH, Rosbach, Fed. Rep. of Germany

[21] Appl. No.: 222,916

[22] PCT Filed: Nov. 2, 1987

[86] PCT No.: PCT/EP87/00656
§ 371 Date: Jun. 16, 1988
§ 102(e) Date: Jun. 16, 1988

[87] PCT Pub. No.: WO88/03546
PCT Pub. Date: May 19, 1988

[30] Foreign Application Priority Data
Nov. 6, 1986 [CH] Switzerland ............ 04435/86

[51] Int. Cl.$^4$ .................... C08F 255/02; C09J 3/14
[52] U.S. Cl. .................... 156/332; 156/333; 525/276; 525/301; 526/245; 522/120; 522/121
[58] Field of Search ............ 526/245; 525/276, 301, 525/292; 156/332, 333; 522/120, 121

[56] References Cited

U.S. PATENT DOCUMENTS

| 4,107,386 | 8/1978 | Gruber | 525/468 |
| 4,112,013 | 9/1978 | Briggs | 525/301 |
| 4,113,792 | 9/1978 | Pastor | 525/155 |
| 4,127,699 | 11/1978 | Aumiller | 524/403 |
| 4,215,209 | 7/1980 | Ray-Chaudhuri | 526/292.3 |
| 4,364,731 | 12/1982 | Norling et al. | 433/218 |
| 4,504,642 | 2/1985 | Ohmori | 526/245 |

FOREIGN PATENT DOCUMENTS

| 196212 | 10/1986 | European Pat. Off. |
| 1594120 | 8/1969 | Fed. Rep. of Germany |
| 185607 | 10/1983 | Japan |
| 152909 | 8/1984 | Japan |
| 2087906 | 6/1982 | United Kingdom |

Primary Examiner—John C. Bleutge
Assistant Examiner—David Buttner
Attorney, Agent, or Firm—Walter C. Farley

[57] ABSTRACT

The dental agent is based on a liquid monomer, mixture of monomers or prepolymer containing acrylic, methacrylic or vinyl groups with addition of acrylic or methacrylic acid as the base mixture, and further contains
(A) a halogen-sulfonated polyolefin and/or
(B) a halogenated acrylate or methacrylate.

The boding agent is especially well suited to prepare permanent composite dental bonding of metal and plastic and of ceramics and plastics.

10 Claims, No Drawings

DENTAL ADHESIVE COMPOUND

This invention relates to a bonding agent based on a liquid monomer, a mixture of monomers or a prepolymer containing acrylic, methacrylic or vinyl groups with the addition of acrylic or methacrylic acid as the base mixture, and its application to dentistry.

BACKGROUND OF THE INVENTION

Dental bonding agents are used to form a permanent bond between alloys of high-grade or low-grade metals or ceramics on one hand, and dental plastics on the other. The problem of improving the bond between plastics and dental prosthetic parts made of metal or ceramics is hardly new. Most recently, endeavors have intensified to achieve long-life composites.

As an example, U.S. Pat. No. 4,364,731 discloses a process in which a metal surface is coated by a magnetron sputterer in vacuum with an inorganic layer of silicon dioxide which is separated from the substrate by highly pure quartz glass. A similar method is described in German patent document DE-Cl 34 03 894 wherein the $SiO_xC$ layer is deposited by flame pyrolysis on the metal. However, these recent developments involve substantial equipment.

Another approach to improving the bonding between metal and plastic was based on the insight that additions of acrylic or methacrylic acid to monomers with radical polymerizing double bonds provide excellent adhesion. However, the drawback is incurred that the good bond of such metal-plastic composites is lost before very long due to humidity.

SUMMARY OF THE INVENTION

An object of the present invention is to create a bonding agent allowing a lasting connection between metal and plastic, or between ceramics and plastics, and in particular between dental alloys and acrylate or methacrylate plastics of the types conventionally used in dentistry and dental surgery and wherein this bonding agent will permanently withstand the oral stresses (humidity, changes in temperature and mechanical loads), without boundary gas between the metal and plastics or between ceramics and plastics.

Briefly described, the invention comprises a bonding agent comprising a liquid monomer, a mixture of monomers or a prepolymer containing acrylic, methacrylic or vinyl groups with the addition of acrylic or methacrylic acid as a base mixture and wherein the base mixture additionally contains at least one of (A) a halogen-sulfonated polyolefin and (B) a halogenated acrylate or methacrylate.

The advantages achieved by the invention, essentially, are that, on account of its bonding agent, the bond of liquid monomers, of monomer mixtures or the prepolymer containing radically polymerizing acrylates, methacrylates or vinyl groups with the additions of acrylic or methacrylic acid, will be subjected to only minor moisture losses and therefore a permanent, durable and unchanging composite can be made.

The bond becomes optimal especially when both additives, that is, both the halogen-sulfonated polyolefin and a halogenated acrylate or methacrylate, are mixed in with the base mixture.

Especially suitable halogen-sulfonated polyolefins are the chloro-sulfonated polyolefins, especially of the polyethylene or polypropylene types.

Especially suitable acrylates or methacrylates are the fluorinated mono- or poly-functional acrylates or methacrylates which impart hydrophobic properties to the polymer composite. The following fluorinated monomers provide especially good results:

1,1-Dihydro-pentadecafluorooctyl-methacrylate

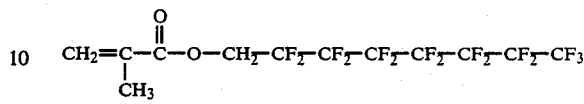

1,1,5-Trihydro-octafluoropentyl-methacrylate

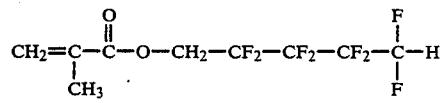

2,2,3,3-Tetrafluoropropyl-methacrylate

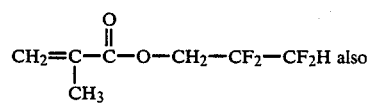

also
2,2,3,3,4,4-Hexafluoro-1,5-pentanediol-dimethacrylate

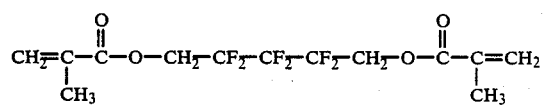

as the crosslinking monomer.

The invention is discussed more comprehensively below with reference to the following Examples.

EXAMPLE 1 (state of the art)

A binary mixture of the following ingredients was prepared:

| | |
|---|---|
| Component A | 70.0 parts of methylmethacrylate |
| | 18.5 parts of 1,4-butanedioldimethacrylate |
| | 10.5 parts of methacrylic acid |
| | 1.5 parts of dibenzoyl peroxide |
| Component B | 70.0 parts of methylmethacrylate |
| | 10.0 parts of methacrylic acid |
| | 1.0 part of N,N'-dimethyl-p-toluidine. |

When mixing equal parts of components A and B, the material cures at room temperature in 5 to 7 minutes into a film which rapidly bonds hard to dental alloys.

EXAMPLE 2

Component A:

30 g of a chlorosulfonated polyethylene with a distribution of molecular weights between 10,000 and 40,000, with a chlorine content of 29% and a sulfur content of 1.4% are dissolved by intensive stirring at 50° C. over a substantial length of time in 50 g of methylmethacrylate. Thereupon
10 g of methacrylic acid
9 g of 1,4-butanedioldimethacrylate and
1 g of dibenzoyl peroxide
are added at room temperature.
Component B:

The preparation is similar to that of component A, but with 1.0 g of N'N-dimethyl-p-toluidine instead of dibenzoyl peroxide.

When mixing equal parts of components A and B, the material of the invention cures at room temperature in 5-7 minutes into flexible film bonding hard to conventional dental alloys.

EXAMPLE 3

Component A:

30 g of a chloro-sulfonated polyethylene with a molecular-weight distribution between 20,000 and 40,000, with a chlorine content of 29% and a sulfur content of 1.4% are dissolved as described in Example 2 in 25 g of methylmethacrylate and in 25 g of 1,1,5-trihydro-tetrafluoropropylmethacrylate.

The solution is diluted at room temperature with
10 g methacrylic acid
9 g hexafluoro-1,5-pentanediol-dimethacrylate
and
1 g dibenzoyl peroxide.

Component B:

Its preparation is similar to that of component A, except for 1.0 g of N,N'-dimethyl-p-toluidine in lieu of dibenzoyl peroxide.

When equal parts of the components A and B are mixed, the material of the invention cures at room temperature after 7 minutes into a flexible film bonding hard to conventional dental alloys.

EXAMPLE 4

The preparation is similar to that of component A of Example 3, except for replacing the dibenzoyl peroxide with 1.0 g of benzildimethylketal. Under irradiation with OSRAM fluorescent tubes (Dulux S9W/78), this single component material cures with in 4 minutes to a flexible film bonding hard to dental alloys.

CONTROL TEST (A) Water absorption

In order to test water absorption to Specification ADA 27, disk samples 1 mm thick and 20 mm in diameter were made. These samples were stored in a dessicator with silica gel until the weight loss from one day to the next became less than 0.5 mg. Thereupon the sample was stored for 7 days in water at 37° C. Next the sample was dried and weighed. The water absorption in mg/cm$^2$ of sample surface was computed from the weight loss and the sample dimensions.

| Example # | Water absorption in mg/cm$^2$ |
| --- | --- |
| 1 | 3.40 ± 0.60 |
| 2 | 0.89 ± 0.03 |
| 3 | 0.21 ± 0.03 |
| 4 | 0.15 ± 0.04 |

(B) Shear-off test

The test was carried out using a standardized method on a ZWICK Universal Tester type 1435 at 1 mm/min.

The systems used as control materials (ISOSIT N and SILICOATING) are processed rigorously in accordance with manufacturer's instructions.

The following values were obtained:
the base value following 24 h storage in air at room temperature
the value following storage for one, three and six months at 37° C. in distilled water, and
the value following temperature cycling between 4° C. and 54° C. with a dwell time of 30 seconds each.

Each value was ascertained as an average of ten measurements. The table below shows the bonding values.

TABLE

| | Measured bonding values in N/mm$^2$ | | | | | |
| --- | --- | --- | --- | --- | --- | --- |
| | | Water Storage at 37° C. | | | corundum | 200 intervals |
| Material | Base Value | 1 month | 3 months | 6 months | grain size | 4°–54° C. |
| Isosit N (Vivadent) | 7.6 ± 0.8 | 6.4 | 6.1 | 5.0 | 50 | 3.4 ± 0.5 |
| Isosit N | 6.7 ± 0.9 | 5.7 | 5.7 | 4.7 | 200 | 3.5 ± 1.0 |
| Silicoating (Kulzer) | 5.6 ± 0.7 | 6.7 | 6.5 | 5.0 | 50 | 8.5 ± 1.5 |
| Silicoating | 6.2 ± 6.4 | 7.1 | 7.1 | 6.4 | 200 | 6.0 ± 0.8 |
| Example 1 | 10.5 ± 1.0 | 6.7 | 5.2 | 3.9 | 50 | 4.8 ± 0.7 |
| Example 1 | 10.9 ± 1.2 | 5.9 | 4.9 | 2.8 | 200 | 4.4 ± 1.1 |
| Example 2 | 10.9 ± 0.3 | 10.4 | 10.0 | 9.3 | '50 | 8.8 ± 0.5 |
| Example 2 | 11.2 ± 0.5 | 10.2 | 10.0 | 9.0 | 200 | 9.1 ± 0.5 |
| Example 3 | 10.2 ± 0.2 | 10.7 | 10.4 | 10.5 | 50 | 9.9 ± 0.9 |
| Example 3 | 10.0 ± 0.2 | 9.9 | 10.2 | 9.8 | 200 | 10.1 ± 1.1 |
| Example 4 | 10.9 ± 0.7 | 11.4 | 11.4 | 11.3 | 50 | 11.0 ± 0.4 |
| Example 4 | 12.0 ± 0.3 | 11.9 | 12.1 | 11.9 | 200 | 11.7 ± 0.4 |

Remark:
The rise of several bonding values in spite of loads, for instance temperature intervals, as interpreted as being post-curing.

What is claimed is:

1. A bonding agent based on a liquid monomer, mixture of monomers or prepolymer containing acrylic, methacrylic or vinyl groups, with addition of acrylic or methacrylic acid as a base mixture, characterized in that the base mixture additionally contains
   (A) a halogen-sulfonated polyolefin, and
   (B) a fluorinated acrylate or methacrylate.

2. A bonding agent according to claim 1, characterized in that the halogen-sulfonated polyolefin is a chloro-sulfonated polyolefin.

3. A bonding agent according to claim 2, characterized in that the halogen-sulfonated polyolefin is a chloro-sulfonated polyethylene with a molecular-weight distribution between 20,000 and 40,000, a chlorine content between 29 and 43% and a sulfur content between 1.0 and 1.5%.

4. A bonding agent according to claim 3, characterized in that the fluorinated acrylate or methacrylate is a fluorinated mono- or poly-functional acrylate or methacrylate.

5. A bonding agent of claim 2 wherein said chlorosulfonated polyolefin is a polyethylene.

6. A bonding agent of claim 2 wherein said chlorosulfonated polyolefin is a polypropylene.

7. A bonding agent of claim 4 wherein said fluorinated acrylate is selected from the group consisting of
1,1-dihydro-pentadecafluorooctyl-methacrylate,
1,1,5-trihydro-octafluoropentyl-methacrylate,
2,2,3,3-tetrafluoropropyl-methacrylate,
2,2,3,3,4,4-hexafluoro-1,5-pentanedioldimethacrylate,
and mixtures thereof.

8. A bonding agent of claim 1 wherein said acrylic or methacrylic acid is present in an amount of about 20%, said halogen-sulfonated polyolefin is present in an amount of about 60% and said fluorinated acrylate or methacrylate is present in an amount of about 18%, said percentages being by weight and being based on the total weight of said bonding agent.

9. A method of bonding a polymeric surface to a non-polymeric surface comprising the steps of
(a) coating at least one of the polymeric or non-polymeric surfaces with a bonding agent of claim 1 and placing the surfaces in substantially face-to-face relationship with bonding agent extending therebetween, and
(b) causing the bonding agent to cure.

10. A bonding agent based on a liquid monomer, mixture of monomers or prepolymer containing acrylic, methacrylic or vinyl groups, with addition of about 20% of an acrylic or methacrylic acid as a base mixture, characterized in that the base mixture additionally contains
(a) about 60% of a chlorosulfonated polyethylene with a molecular-weight distribution between 20,000 and 40,000, a chlorine content between 29 and 43% and a sulfur content between 1.0 and 1.5%, and
(b) about 18% of a fluorinated acrylate or methacrylate selected from the group consisting of
1,1-dihydro-pentadecafluorooctylmethacrylate,
1,1,5-trihydro-octafluoropentylmethacrylate,
2,2,3,3-tetrafluoropropyl-methacrylate,
2,2,3,3,4,4-hexafluoro-1,5-pentanedioldimethacrylate, and mixtures thereof,
said percentages being by weight and being based on the total weight of the bonding agent.

* * * * *